(12) United States Patent
Güimil et al.

(10) Patent No.: US 7,737,089 B2
(45) Date of Patent: *Jun. 15, 2010

(54) PHOTOACTIVATABLE TWO-STAGE PROTECTIVE GROUPS FOR THE SYNTHESIS OF BIOPOLYMERS

(75) Inventors: Ramon Güimil, Heidelberg (DE);
Matthias Scheffler, Hirschberg/Leutershausen (DE); Barbro Beijer, Nussloch (DE)

(73) Assignee: Febit Holding GmbH, Heidelberg (DE)

( * ) Notice: Subject to any disclaimer, the term of this patent is extended or adjusted under 35 U.S.C. 154(b) by 987 days.

This patent is subject to a terminal disclaimer.

(21) Appl. No.: 10/540,396

(22) PCT Filed: Dec. 23, 2003

(86) PCT No.: PCT/EP03/14822

§ 371 (c)(1),
(2), (4) Date: Sep. 21, 2005

(87) PCT Pub. No.: WO2004/058391

PCT Pub. Date: Jul. 15, 2004

(65) Prior Publication Data

US 2006/0111564 A1    May 25, 2006

(30) Foreign Application Priority Data

Dec. 23, 2002  (DE) .................... 102 60 591
Dec. 23, 2002  (DE) .................... 102 60 592

(51) Int. Cl.
*C40B 70/00*    (2006.01)
(52) U.S. Cl. .............. 506/41; 536/25.32; 435/68.1; 535/25.3

(58) Field of Classification Search ............ None
See application file for complete search history.

(56) References Cited

U.S. PATENT DOCUMENTS

2004/0197851 A1* 10/2004 Guimil et al. ............ 435/68.1

FOREIGN PATENT DOCUMENTS

| DE | 101 22 357 A | | 11/2002 |
|----|--------------|---|---------|
| WO | WO 00/66259 A | | 11/2000 |
| WO | WO 02/20150 A | | 3/2002 |
| WO | WO 02/62815 A | | 8/2002 |
| WO | WO 03/04510 | * | 1/2003 |
| WO | WO 03/004510 A | | 1/2003 |
| WO | WO 2004/058392 | * | 7/2004 |

OTHER PUBLICATIONS

Happ et al., "New Trityl-Based Protecting Groups with a Mild Two-Step Removal", *Nucleosides & Nucleotides*, vol. 7, No. 5/6, 1988 pp. 813-816.

* cited by examiner

*Primary Examiner*—Christopher Low
*Assistant Examiner*—Christopher M Gross
(74) *Attorney, Agent, or Firm*—Rothwell, Figg, Ernst & Manbeck, P.C.

(57) ABSTRACT

The present invention relates to a process for synthesizing biopolymers by stepwise assembly from protected synthesis building blocks which carry two-stage protective groups. The two-stage protective groups are activated by a first illumination step and eliminated by a subsequent chemical treatment step. Photoactivatable components which considerably speed up the activation process via intramolecular triplet sensitizers or/and have fluorescence properties are used. The two-stage protective groups can be used in particular within the framework of quality control.

17 Claims, 3 Drawing Sheets

PHOTOACTIVATABLE TWO-STAGE PROTECTIVE GROUPS FOR THE SYNTHESIS OF BIOPOLYMERS

CROSS REFERENCE TO RELATED APPLICATION

This application is a 35 USC §371 National Phase Entry Application from PCT/EP2003/014822, filed Dec. 23, 2003, and designating the United States.

The present invention relates to a process for synthesizing biopolymers by stepwise assembly from protected synthesis building blocks which carry two-stage protective groups. The two-stage protective groups are activated by a first illumination step and eliminated by a subsequent chemical treatment step. Photoactivatable components which considerably speed up the activation process via intramolecular triplet sensitizers or/and have fluorescence properties are used. The two-stage protective groups can be used in particular within the framework of quality control.

The technology of light-controlled synthesis of biopolymers using photolabile protective groups opens up the possibility of producing biochips in situ by synthesis from monomeric and oligomeric building blocks. Biochips have gained a very considerable importance for research and diagnosis since they permit rapid and highly parallel processing of complex biological problems. However, chips of the highest quality are required for this, so that there is a great interest in novel and more efficient synthetic methods.

Photolabile nucleoside derivatives are used in the light-controlled synthesis of nucleic acid chips. In this connection, the assembly of the chain of nucleic acid fragments normally takes place using phosphor-amidite synthons. The building blocks each carry a temporary photoprotective group which can be removed by incident light. The principle of the synthesis provides for a cyclic sequence of condensation and deprotection steps (by light). The efficiency with which such a light-controlled synthesis can take place is determined essentially by the photolabile protective groups used, in particular by the efficiency with which they can be removed in the irradiation step. The photoprotective groups used to date for light-controlled synthesis are normally the protective groups NVOC (S. P. A. Fodor et al., Science 251 (1991), 767 ff.), MeNPOC (A. C. Pease et al., Proc. Natl. Acad. Sci. 91 (1994), 5022 ff.), DMBOC (M. C. Pirrung, J. Chem. 60 (1995), 1116 ff.) and NPPOC (A. Hassan et al., Tetrahedron 53 (1997), 4247 ff.). Further known photolabile protective groups in nucleoside and nucleotide chemistry are o-nitrobenzyl groups and their derivatives (cf., for example, Pillai, Org. Photochem. 9 (1987), 225; Walker et al., J. Am. Chem. Soc. 110 (1988), 7170). A further photolabile protective group which has been proposed is the 2-(o-nitrophenyl) ethyl group (Pfleiderer et al., in: "Biosphosphates and their Analogues—Synthesis, Structure, Metabolism and Activity", ELSEVIER Science Publishers B. V. Amsterdam (1987), 133 ff.) and derivatives thereof (WO 97/44345 and WO 96/18634).

The photolabile protective groups currently used for light-controlled synthesis of nucleic acids (e.g. NVOC, MeNPOC, NPPOC) are generally distinguished by a comparatively low absorption coefficient at the wavelength of the incident light. Irradiation of photolabile nucleoside derivatives normally takes place with high pressure Hg lamps at a wavelength of 365 nm. The result of the low absorption coefficient of the photolabile protective group used at this wavelength is that only a very small proportion of the incident light can be utilized for excitation of the molecules. In addition, the photolabile protective groups used are mostly colorless derivatives. The result of this in turn is that it is not possible during the synthesis to detect by simple spectroscopic methods whether the photolabile protective group is still present on the nucleoside derivative or has already been partly or completely abstracted by the input of light. The abstraction process can thus be followed only with difficulty or not at all.

DE 101 32 925.6 and PCT/EP02/07389 propose the use of two-stage protective groups, where the two-stage protective groups are activated by an illumination step and eliminated by a subsequent chemical treatment step. The two-stage protective groups are preferably trityl derivatives which are coupled to a photoactivatable protective group. The trityl derivatives may also comprise fluorescent groups in addition.

In order to eliminate the disadvantages of the previously published prior art, according to the present invention specific photoactivatable groups are linked to a second component whose elimination conditions are orthogonal to those of the photoactivatable groups, and whose removal leads to exposure of the actual protective group which can be eliminated by chemical means, e.g. acid catalysis. The protective group eliminated by chemical means, which is preferably colored or/and fluorescent, can be employed for quality control during the synthesis of biopolymers.

The present invention provides a novel protective group with which the activation step is induced by light and the actual deprotection step at the reaction site takes place by chemical means, e.g. acid catalysis (FIG. 1). This novel protective group, and molecules carrying this protective group, can be employed for the synthesis of biopolymers.

One aspect of the invention is thus a process for the synthesis of biopolymers by stepwise assembly from synthesis building blocks which carry protective groups, with use of at least one synthesis building block which carries a two-stage protective group which is activated by an illumination step and is eliminated by a subsequent chemical treatment step, using as photoactivatable group a triplet-sensitized photoactivatable group, a labeled, e.g. fluorescent photoactivatable group or/and a labeled, e.g. fluorescent and triplet-sensitized photoactivatable group. The illumination step preferably comprises the elimination of a first photolabile component of the protective group, leaving behind a second component of the protective group which is essentially stable to the conditions prevailing on elimination of the first component and which can subsequently be eliminated by a chemical treatment step. The chemical treatment step preferably comprises a treatment with base, a treatment with acid, an oxidation, a reduction or/and catalytic, e.g. an enzymatic, reaction. The chemical treatment step particularly preferably comprises an acid treatment.

In a particularly preferred embodiment of the invention, a derivatized trityl group is used as two-stage protective group. Trityl groups are notable for their excellent ease of elimination, in particular by treatment with acid. The two-stage trityl protective groups of the invention are, by contrast, not acid-labile but are converted into an acid-labile form only after activation and elimination of one or more photolabile components.

Triplet-sensitized photoactivatable groups and labeled, e.g. fluorescent, and triplet-sensitized photoactivatable groups on the one hand have a high molar extinction coefficient at the incident wavelength in order to contribute to a significant increase in the population in the triplet state, and on the other hand are able to stabilize a tertiary free radical in the aci-nitro form via I or M effects. This leads to an increase in the overall quantum yield of the activation step. Labeled photoactivatable groups (without triplet sensitization) show merely a high molar extinction coefficient at the incident wavelength, but have no direct effect on the activation process. All said types of photoactivatable groups are particularly suitable in quality control, for example in fluidic microprocessors as described for example in WO 00/13018.

Particular preference is therefore given to a synthesis building block which has a two-stage protective group and which has the general formula (I):

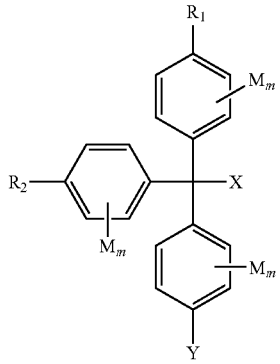

(I)

where $R_1$ and $R_2$ are each independently selected from hydrogen, (L)-$R_3$, O-(L)-$R_3$, N($R_3$)$_2$, NHZ and M, $R_3$ is a $C_1$-$C_8$ alkyl group, a $C_2$-$C_8$-alkenyl group, a $C_2$-$C_8$-alkynyl group, a $C_6$-$C_{25}$ aryl group or/and a $C_5$-$C_{25}$-heteroaryl group, each of which may optionally have one or more substituents, L is a linker group which is optionally present, which is for example —(CH$_2$)$_n$—, —(CH$_2$)$_n$—COO—, —(CH$_2$)$_n$—CONH— or —(CH$_2$)$_n$—SO$_2$O—, —(CH$_2$)$_n$—O—, —(CH$_2$)$_n$—S— or —(CH$_2$)$_n$—NH—, and n is an integer from 0 to 20, M is in each case independently a label optionally linked via a linker group L (as defined above), and m is in each case independently an integer from 0 to 4, preferably 0, 1 or 2, X is the synthesis building block, Y is in each case independently a photoactivatable protective group as indicated above, Z is an amino protective group, and where $R_1$ or/and $R_2$ may optionally be replaced by Y.

The alkyl, alkenyl and alkynyl groups may be linear or cyclic, straight-chain or branched. The aryl or heteroaryl groups, e.g. N-, O- or/and S-heteroaryl groups, may be mono- or polycyclic. Examples of substituents of alkyl, alkenyl, alkynyl, aryl and heteroaryl groups are halogen, e.g. F, Cl, Br, I, OH, SH, —O—, —S—, —S(O)$_2$—, NO$_2$, CN, COOH, CO—$C_1$-$C_8$-alkyl, COO—$C_1$-$C_8$-alkyl, OCO—$C_1$-$C_8$-alkyl, CONH—$C_1$-$C_8$-alkyl, CON—($C_1$-$C_8$)-alkyl) 2, $C_1$-$C_8$-alkyl, $C_2$-$C_8$-alkenyl, $C_2$-$C_8$-alkynyl, $C_1$-$C_8$-alkoxy, —S—$C_1$-$C_8$-alkyl, di($C_1$-$C_8$-alkyl)amino and NHZ, where the alkyl, alkenyl, alkynyl and alkoxycarbonyl groups may in turn be substituted by halogen. Preferred meanings for $R_1$ and $R_2$ are hydrogen, dialkylamine, e.g. N,N-dimethyl, O-methyl, OCOO-methyl or a protective amino group, e.g. an amino group converted into an amide function with a suitable carboxylic acid. The number of carbon atoms in the radicals $R_1$ and $R_2$ of the compound is preferably restricted to 25 in each case.

The invention also encompasses compounds which carry a plurality of photoactivatable groups, in particular compounds of the formula (I) in which at least one of $R_1$ or $R_2$ is replaced by a photoactivatable protective group. It is preferred for 1 to 3 photoactivatable protective groups to be present. It is additionally possible for one or more labeling groups to be present and to be linked to the photoactivatable component or/and to the chemically active component. Thus, one or more labeling groups in the compounds (I) may be present at the o or/and m positions of the phenyl rings in the trityl system.

It is possible by varying the radicals $R_1$ and $R_2$ and substituting one or both radicals by photoactivatable protective groups to adapt the acid lability to the desired requirements.

In a preferred embodiment, labeled photoactivatable groups of the formula (II) are used:

(II)

in which Ar is a fused polycyclic, preferably tetra-, penta- or hexacyclic, fluorescent aryl or heteroaryl, $S_1$ and $S_2$ are each independently selected from hydrogen, a $C_1$-$C_8$-alkyl group, a $C_2$-$C_8$-alkenyl group, a $C_2$-$C_8$-alkynyl group, a $C_6$-$C_{25}$-aryl or/and a $C_5$-$C_{25}$-heteroaryl group, each of which may optionally have substituents, and Q is a group for linking the photolabile component to the component which can be eliminated chemically. The number of carbon atoms in the radicals Ar, $S_1$ and $S_2$ of the compound (II) is preferably restricted to 25 in each case.

Examples of suitable fluorescent aryl radicals are benzo[b]fluoranthrene, fluoranthrene, 9,10-diphenyl-anthracene, acenaphthylene or pyrene.

Substituents of the groups Ar, $S_1$ and $S_2$ are as defined above for the compounds of the formula (I). Q is preferably SO$_2$, OCO, OCS or CS$_2$.

Particular preference is given to compounds (II) in which $S_1$ and $S_2$ are H, e.g. the compound PyMOC (as indicated in U.S. Pat. No. 6,147,205).

In a further preferred embodiment there is use of a photoactivatable group of the general formula (III)

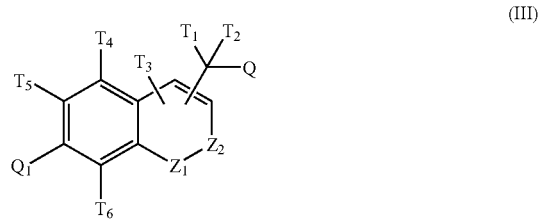

(III)

in which $T_1$, $T_2$, $T_3$, $T_4$, $T_5$ and $T_6$ are each independently selected from hydrogen, $C_1$-$C_8$-alkyl, $C_2$-$C_8$-alkenyl, $C_2$-$C_8$-alkynyl, $C_1$-$C_8$-alkoxy, $C_2$-$C_8$-alkoxycarbonyl, $C_6$-$C_{25}$-aryl or aryloxy or/and $C_5$-$C_{25}$-heteroaryl or heteroaryloxy, each of which may optionally have substituents, and $T_1$ or/and $T_2$ may additionally be trialkylsilyl, and one of $T_3$ and $T_4$ may be NO$_2$, with the proviso that the other is then H, $Q_1$ is hydrogen, optionally substituted $C_1$-$C_4$-alkoxy or di($C_1$-$C_4$-alkyl)-amino, $Z_1$ and $Z_2$ together are —OC(O)—, —NT$_7$C(O)— or —CT$_8$=CT$_9$, where $T_8$ and $T_9$ are defined as $T_3$-$T_6$, and $T_9$ may additionally be NO$_2$, and adjacent groups, e.g. $T_8$ and $T_9$, may form a 5- or 6-membered carbocyclic or heterocyclic, saturated or unsaturated ring, and Q is a group for linking the photolabile component to the component which can be eliminated chemically. The number of carbon atoms in the radicals $T_1$-$T_9$ of compound (III) is preferably restricted to 25 in each case.

The possible substituents of the respective groups are in this case as defined above for the compounds of the formula (I). Q is preferably a group of the general formula:

-Q$_2$-C(Q$_3$)-, where $Q_2$ is —O—, —S—, —CH$_2$O— or —CH$_2$S—, and $Q_3$ is =O or =S. Examples of suitable compounds of the formula (III) are described for example in WO 02/20150.

In yet a further preferred embodiment there is use of labeled photoactivatable groups of the general formula (IV):

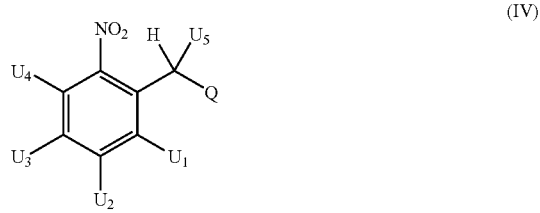

(IV)

in which $U_1$, $U_2$, $U_4$ and $U_5$ are each independently selected from hydrogen, halogen, NO$_2$, $U_6$, (L)-$U_6$, O-(L)-$U_6$, N($U_6$)$_2$ and NHZ, $U_6$ is C$_1$-C$_8$-alkyl, C$_2$-C$_8$-alkenyl, C$_2$-C$_8$-alkynyl, C$_6$-C$_{25}$-aryl or C$_5$-C$_{25}$-heteroaryl, each of which may optionally have substituents, L is a linker group which is optionally present, e.g. as defined for the compounds (I), $U_3$ is a labeling group optionally linked via a linker group, e.g. as defined for the compound (I), e.g. a fluorescent group, and Q is a group for linking the photolabile component to the component which can be eliminated chemically. The number of carbon atoms in the radicals $U_1$-$U_5$ is preferably restricted to 25 in each case. Adjacent radicals may optionally form a 5- or 6-membered carbocyclic or heterocyclic, saturated or unsaturated ring.

The definition of the possible substituents on the radicals $U_1$, $U_2$, $U_4$ and $U_5$ is as described for the compounds (I). Q is preferably SO$_2$, OCO, OCS, CS$_2$, CH$_2$SO$_4$, CH$_2$OCO, CH$_2$OCS, CH$_2$CS$_2$ etc. The radical $U_3$ preferably has the structure —O-L-NHCOM where L is a linker having a chain length of preferably 1-10 atoms, e.g. C atoms, and optionally heteroatoms such as O, S or N, and M is a labeling group, e.g. a fluorescent group such as, for example, a pyrene or coumarin group.

The compounds of this type are based on conventional O-nitrobenzyl groups such as, for example, NPPOC, NVOC, MeNPOC, into which a fluorophore has additionally been introduced. The resulting photoactivatable molecule has a label but not a triplet sensitization.

In yet a further preferred embodiment there is use of photoactivatable groups of the formula (V) which are preferably triplet-sensitized and optionally labeled groups:

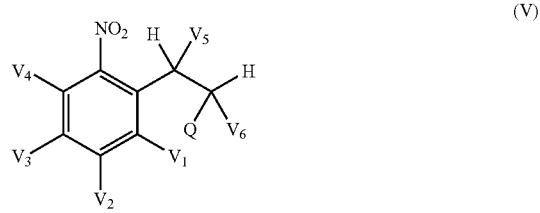

(V)

in which $V_1$, $V_2$, $V_3$, $V_4$, $V_5$ and $V_6$ are each independently selected from hydrogen, halogen, NO$_2$, $V_7$, (L)-$V_7$, O-(L)-$V_7$, N($V_7$)$_2$, NHZ and M, where $V_7$ is C$_1$-C$_8$-alkyl, C$_2$-C$_8$-alkenyl, C$_2$-C$_8$-alkynyl, C$_6$-C$_{25}$-aryl or C$_5$-C$_{25}$-heteroaryl, each of which may optionally have substituents, L is a linker group which is optionally present, e.g. as defined for the compounds (I), $V_5$ and $V_6$ may additionally be trialkylsilyl, M is a label optionally linked via a linker group, and Q is a group for linking the photolabile component to the component which can be eliminated chemically. The number of carbon atoms in the radicals $V_1$-$V_6$ is preferably restricted to 25 in each case. Adjacent radicals may optionally form a 5- or 6-membered carbocyclic or heterocyclic, saturated or unsaturated ring.

The radical $V_5$ is particularly preferably an aryl, aryloxy, heteroaryl or heteroaryloxy group which may be unsubstituted or may have up to three substituents (as defined above). Particular preference is given to polycyclic aryl, aryloxy, heteroaryl or heteroaryloxy groups which show triplet sensitization and which optionally may have an intrinsic fluorescence, especially if they comprise four or more fused rings, e.g. pyrenes, benzo[b]fluoranthrenes, fluoranthrenes, 9,10-diphenylanthracenes, acenaphthylenes or corresponding oxy derivatives etc.

The invention also includes compounds which carry a plurality of labels which are detectable independently of one another. Examples of suitable labels are fluorescent groups, luminescent groups, electrically detectable groups, e.g. ferrocenes, colored groups, radioactive groups, groups detectable by NMR etc. The labels preferably comprise at least one fluorescent group, which may be combined with another, independently detectable fluorescent group or another type of label as mentioned above. It is preferred for one label to be linked to the photolabile component of the protective group and for the other label to be linked to the component which can be eliminated chemically, so that selective elimination of the photolabile component can be detected by loss of the first label but retention of the second label, and elimination of the chemical component can be detected by loss of the second label. For example, the invention includes compounds (I) which carry a plurality of fluorescent groups, e.g. compounds in which Y is a fluorescent photoprotective group or/and $R_3$ and Z are fluorescent groups on the trityl framework (R. Ramage, F. O. Wahl, Tetrahedron Lett., 34 (1993), 7133) or molecules in which the fluorescence has been introduced by substitution on the trityl framework (J. L. Fourrey et al., Tetrahedron Lett., 28 (1987), 5157).

In a preferred embodiment, the labeling group on the component which can be eliminated chemically is a fluorescent group, e.g. a coumarin or pyrene group, which is coupled via a linker group, e.g. a group as defined above, to the basic trityl framework, e.g. in p, o or/and m position of the phenyl rings in the trityl system.

These labeling groups can be employed for quality control of biochips. This can take place for example in biochip supports as described in WO 00/13018. On use of fluorescent labeling groups care must be taken that the excitation and emission wavelengths do not interfere with the photoinduced activation.

The process of the invention is employed for the synthesis of biopolymers, with the biopolymer to be synthesized being assembled stepwise from a plurality of synthesis building blocks. The process is particularly preferably employed for the synthesis of nucleic acids, e.g. DNA or RNA. However, it should be noted that the process is also suitable for the synthesis of other biopolymers such as, for example, peptides, peptide-nucleic acids (PNAs) or saccharides. The synthesis building block may be a monomeric building block, e.g. a nucleoside derivative or a peptide derivative, or else an oligomeric building block, e.g. a dimer or trimer, i.e. for example a di- or trinucleoside derivative or a di- or tripeptide derivative. The synthesis building block is particularly preferably a phosphoramidite building block. It is, however, also possible to use other nucleotide synthesis building blocks, e.g. phosphate or phosphonate building blocks. A further possibility is also to employ linker or spacer building blocks, e.g. as phosphoramidites, as synthesis building blocks. Particularly preferred linkers or spacers as carriers of two-stage protective groups are described in DE 100 41 539.3.

The synthesis building blocks of the invention carrying a two-stage protective group generally have more strongly lipophilic properties than the synthesis building blocks used to date in the prior art. The solubility of the synthesis building blocks, especially of the phosphoramidite synthons, in organic solvents is increased through this lipophilicity. The more homogeneous reaction management made possible thereby leads to a higher coupling efficiency compared with the pure photolabile phosphoramidite synthons. Elimination of the colored trityl cation of the photoprotective groups of the invention, which has a considerably higher absorption coefficient than the elimination products in other photodeprotection processes, also opens up the possibility of direct online process monitoring. This leads to an improvement in the quality control of biochips.

The trityl group of the photoprotective groups of the invention additionally makes selective functionalization of the 5'-hydroxy function possible. This leads to an enormous reduction in costs, because separation of the 3'-5' isomers is dispensed with.

Particular preference is therefore given according to the present invention to phosphoramidite building blocks which carry the two-stage protective group on the 5'-O atom of the sugar, in particular of the ribose or of the deoxyribose.

The synthesis of the biopolymers can be carried out in a conventional way, for example on a solid phase. It is particularly preferred for a plurality of biopolymers carrying a different sequence of synthesis building blocks to be generated in situ in the form of an array on a single support.

Yet a further aspect of the invention are compounds of the general formula (I)

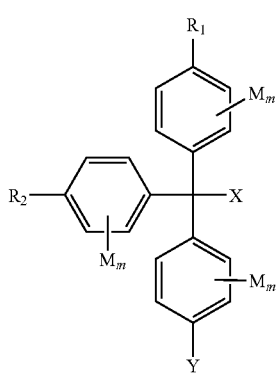

(I)

where $R_1$, Y, M and m are as defined above, and X is a synthesis building block for synthesizing biopolymers or a leaving group, and where $R_1$ or/and $R_2$ may optionally be replaced by Y.

If X is a leaving group, it is a group which can be eliminated on reaction of the compound (I) with another compound. X is preferably a leaving group which can be eliminated by reaction with a nucleophile, optionally in the presence of an auxiliary base such as pyridine. Preferred examples of X are: Cl, Br, I, tosylate, mesylate, trifluorosulfonate etc.

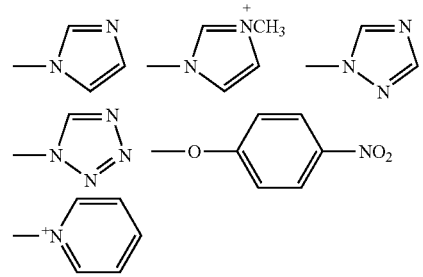

The diagrammatic representation of the protective group concept of the invention is shown in FIG. 1. The synthesis building block (A) carries a two-stage protective group (B-C). In a first illumination step, the photolabile portion (B) of the protective group is eliminated. The chemically labile component (C) of the protective group is eliminated in a second chemical treatment step, e.g. by addition of acid, so that the synthesis building block (A) is present in active form.

FIGS. 2 and 3 show exemplary substances from a preferred class of two-stage protective groups of the invention. They are based on the acid-labile trityl group, but comprise in the p position of one phenyl radical a photolabile triplet-sensitized component (V) which reduces or completely blocks the acid sensitivity of the trityl group. The photolabile component in FIG. 3 shows intrinsic fluorescence. The protective group is converted into an acid-labile form by illumination and elimination of the photolabile component and can subsequently be eliminated in the presence of acid to liberate the unprotected synthesis building block.

Figure 1:
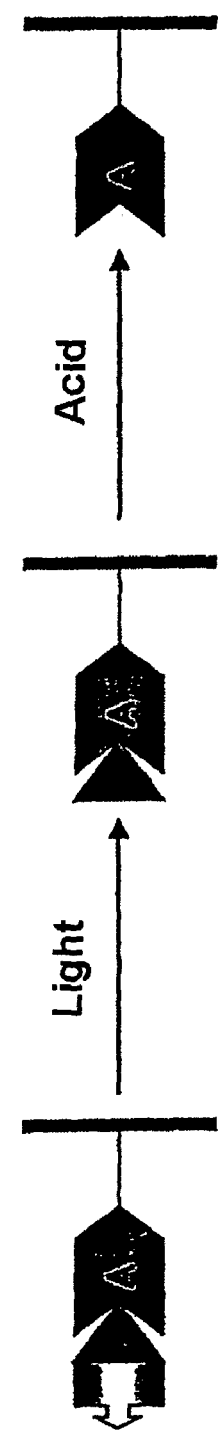
Figure 2:
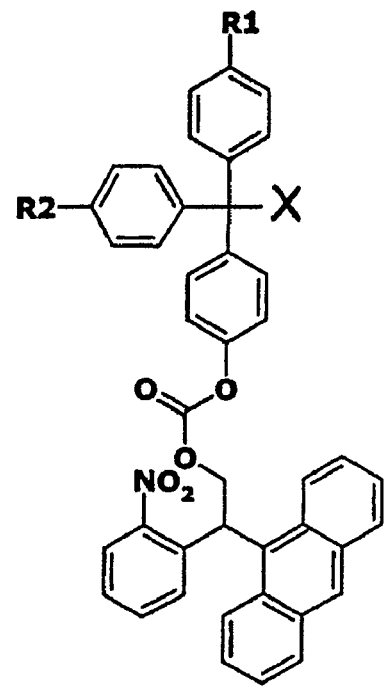
Figure 3:
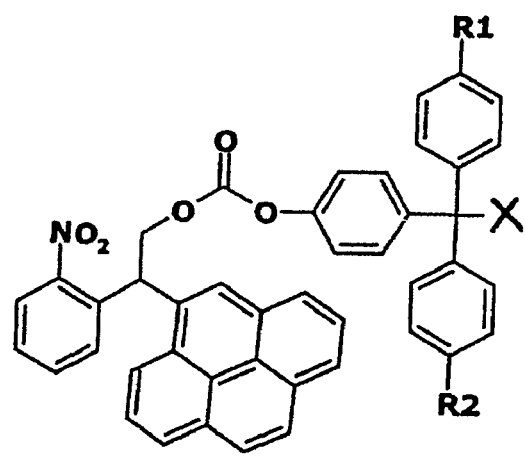
Figure 4:
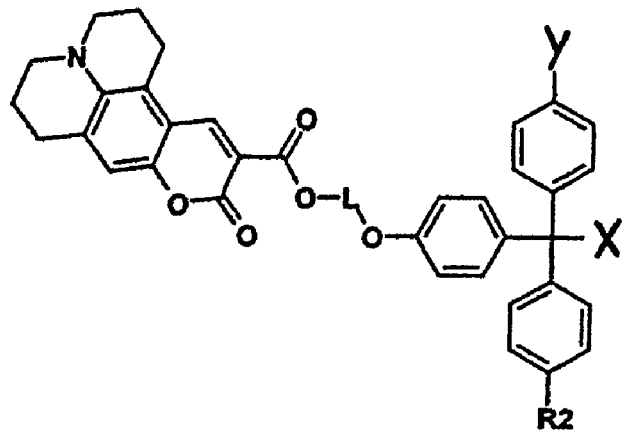
FIG. 4 shows a further exemplary substance according to the present invention, in which, besides the photolabile protective group Y, also a fluorescent radical (in place of $R_1$) is coupled to the trityl framework.
Figure 5:
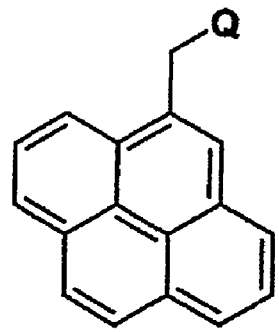
FIG. 5 shows a preferred example of a compound (II), where Q is a group for coupling the photolabile component to the basic trityl framework.
Figure 6:
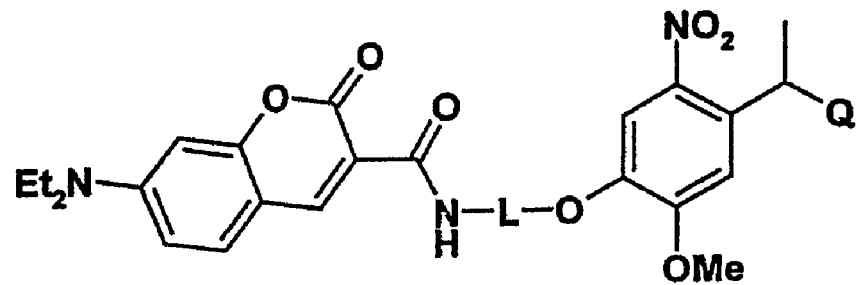
FIG. 6 shows a preferred example of a compound (III), where L is a linker group and Q is a group for coupling the photolabile component to the basic trityl framework.

The invention claimed is:

1. A process for synthesizing biopolymers by stepwise assembly from synthesis building blocks which carry protective groups, where at least one synthesis building block which carries a two-stage protective group is used, where the two-stage protective group is a derivatized trityl group which is activated by an illumination step and eliminated by a subsequent chemical treatment step,
    wherein the activation takes place by elimination of a photoactivatable protective group which is selected from the group consisting of triplet-sensitized photoactivatable groups,
    labeled photoactivatable groups and both.

2. The process as claimed in claim 1, wherein the chemical treatment step comprises a treatment selected from the group consisting of a treatment with base, a treatment with acid, an oxidation, a reduction, a catalyzed-reaction and any combination thereof.

3. The process as claimed in claim 2, characterized in that the chemical treatment step comprises an acid treatment.

4. The process as claimed in claim 1, characterized in that the synthesis building block with the two-stage protective group has the general formula (I):

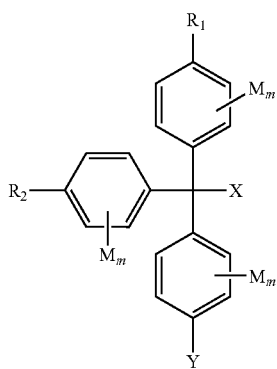

(I)

where $R_1$ and $R_2$ are each independently selected from hydrogen, (L)-$R_3$, —O-(L)-$R_3$, $N(R_3)_2$, NHZ and M, $R_3$ is a $C_1$-$C_8$ alkyl group, a $C_2$-$C_8$-alkenyl group, a $C_2$-$C_8$-alkynyl group, a $C_6$-$C_{25}$-aryl group or/and a $C_5$-$C_{25}$-heteroaryl group, which may optionally have substituents, L is a linker group which is optionally present, X is the synthesis building block, M is in each case independently a label optionally linked via a linker group, and m is in each case independently an integer from 0 to 4, Y is in each case independently a photoactivatable protective group as claimed in claim 1, Z is an amino protective group, and where $R_1$ or/and $R_2$ may optionally be replaced by Y.

5. The process as claimed in claim 1, characterized in that the two-stage protective group carries a plurality of labeling groups which can be detected independently of one another.

6. The process as claimed in claim 5, characterized in that a first label is linked to the photolabile component and a second label is linked to the component which can be eliminated chemically.

7. The process as claimed in claim 4, characterized in that the two-stage protective group comprises at least one fluorescent label.

8. The process as claimed in claim 7, characterized in that a fluorescent label is introduced on the trityl framework of a compound (I).

9. The process as claimed in claim 1, characterized in that the biopolymers are selected from nucleic acids, nucleic acid analogs, peptides and saccharides.

10. The process as claimed in claim 9, characterized in that the biopolymers are selected from nucleic acids and nucleic acid analogs.

11. The process as claimed in claim 10, characterized in that phosphoramidites are used as synthesis building blocks.

12. The process as claimed in claim 11, characterized in that phosphoramidite building blocks carrying the two-stage protective group on the 5'-O atom are used.

13. The process as claimed in claim 1, characterized in that the synthesis of the biopolymers includes the use of spacer and/or linker building blocks.

14. The process as claimed in claim 1, characterized in that the synthesis of the biopolymers is carried out on a solid phase.

15. The process as claimed in claim 14, characterized in that a location-dependent synthesis of a plurality of biopolymers is carried out with in each case a different sequence of synthesis building blocks on a single support.

16. The process as claimed in claim 1, characterized in that a synthesis building block with two-stage protective group is used for quality control.

17. The process as claimed in claim 2, wherein said catalyzed reaction is an enzymatic reaction.

\* \* \* \* \*